(12) United States Patent
Wei et al.

(10) Patent No.: US 11,889,401 B2
(45) Date of Patent: *Jan. 30, 2024

(54) METHODS, WIRELESS COMMUNICATIONS NETWORKS AND INFRASTRUCTURE EQUIPMENT

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,183

(22) Filed: Sep. 12, 2022

(65) Prior Publication Data

US 2023/0007566 A1 Jan. 5, 2023

Related U.S. Application Data

(63) Continuation of application No. 17/041,453, filed as application No. PCT/EP2019/056656 on Mar. 18, 2019, now Pat. No. 11,457,397.

(30) Foreign Application Priority Data

Mar. 28, 2018 (EP) ..................................... 18164770

(51) Int. Cl.
*H04W 40/22* (2009.01)
*H04L 45/24* (2022.01)
(Continued)

(52) U.S. Cl.
CPC ............. *H04W 40/22* (2013.01); *H04L 45/24* (2013.01); *H04W 40/04* (2013.01); *H04W 40/12* (2013.01); *H04W 40/248* (2013.01); *H04W 88/04* (2013.01)

(58) Field of Classification Search
None
See application file for complete search history.

(56) References Cited

U.S. PATENT DOCUMENTS 11,457,397 B2 * 9/2022 Wei ....................... H04W 40/12
2007/0030809 A1 2/2007 Dayama
(Continued)

FOREIGN PATENT DOCUMENTS

WO 2017/004253 A1 1/2017

OTHER PUBLICATIONS

International Search Report and Written Opinion dated Jul. 3, 2019 for PCT/EP2019/056656 filed on Mar. 18, 2019, 11 pages.
3GPP, "3rd Generation Partnership Project; Technical Specification Group Radio Access Network; Study on Integrated Access and Backhaul," Release 15, 3GPP TR 38.874 V0.1.0, Feb. 2018, pp. 1-11.

(Continued)

*Primary Examiner* — Brian S Roberts
(74) *Attorney, Agent, or Firm* — XSENSUS LLP

(57) ABSTRACT

A method comprising receiving, at a first equipment acting as a donor node connected to a core network part of the wireless network, from a second equipment, information relating to each of a plurality of different communications paths from the second equipment to the first equipment via one or more other equipment acting as relay nodes, determining, based on the received information, that either at least a part of a new communications path exists between the first of the equipment and the second of the equipment or at least a part of a previously known communications path no longer exists between the first of the equipment and the second of the equipment, and updating a communications path list by either adding the at least the part of the new communications path or deleting the at least the part of the previously known communications path that no longer exists.

20 Claims, 7 Drawing Sheets

(51) Int. Cl.
*H04W 40/04* (2009.01)
*H04W 40/12* (2009.01)
*H04W 40/24* (2009.01)
*H04W 88/04* (2009.01)

(56) References Cited

U.S. PATENT DOCUMENTS

| | | |
|---|---|---|
| 2008/0144512 A1 | 6/2008 | Molisch et al. |
| 2013/0310052 A1 | 11/2013 | Timus et al. |
| 2017/0289976 A1* | 10/2017 | Lai .................. H04W 28/02 |
| 2019/0182140 A1* | 6/2019 | Tenny ............... H04W 48/20 |
| 2019/0215055 A1* | 7/2019 | Majmundar ......... H04W 40/04 |
| 2019/0223002 A1* | 7/2019 | Novlan ............... H04W 72/20 |

OTHER PUBLICATIONS

AT&T, et al., "New SID Proposal: Study on Integrated Access and Backhaul for NR," 8881123GPP TSG RAN Meeting No. 75, RP-170821, Dubrovnik, Croatia, Mar. 6-9, 2017, 5 pages.
Holma, H. and Toskala, A., "System Architecture Based on 3GPP SAE," LTE for UMTS OFDMA and SC-FDMA based radio access, John Wiley and Sons, 2009, pp. 25-27.
Huawei and Hisilicon, "Revised work item proposal: Enhancements of NB-Iot," 3GPP TSG RAN Meeting No. 73, RP-161901, revision of RP-161324, New Orleans, USA, Sep. 19-22, 2016, 8 pages.
Qualcomm, et al., "Proposals on IAB Architecture," 3GPP TSG-RAN WG2 NR Ad hoc 1801, R2-1801606, Vancouver, Canada, Jan. 22-26, 2018, 7 pages.

* cited by examiner

METHODS, WIRELESS COMMUNICATIONS NETWORKS AND INFRASTRUCTURE EQUIPMENT

CROSS-REFERENCE TO RELATED APPLICATIONS

The present application is a continuation of U.S. application Ser. No. 17/041,453, filed Sep. 25, 2020, which is based on PCT filing PCT/EP2019/056656, filed Mar. 18, 2019, which claims priority to EP 18164770.2, filed Mar. 28, 2018, the entire contents of each are incorporated herein by reference.

BACKGROUND

Field of Disclosure

The present disclosure relates to methods and apparatus for the management of communications routes between various infrastructure equipment and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need for the effective management of routes between infrastructure equipment (which may through their wireless backhaul links act as relay nodes) and the core network, when such infrastructure equipment may be located remotely from the core network.

SUMMARY OF THE DISCLOSURE

The present disclosure can help address or mitigate at least some of the issues discussed above.

Embodiments of the present technique can provide a method of controlling communications within a wireless communications network. The communications network comprises a plurality of infrastructure equipment each being configured to communicate with one or more others of the infrastructure equipment via a backhaul communications link, one or more of the infrastructure equipment each being configured to communicate with one or more communications devices via a wireless access interface. The method comprises receiving, at a first of the infrastructure equipment acting as a donor node connected to a core network part of the wireless communications network, from a second of the infrastructure equipment, information relating to each of a plurality of different communications paths from the second infrastructure equipment to the first infrastructure equipment via one or more others of the infrastructure equipment acting as relay nodes, determining, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and updating a communications path list by either adding the at least the part of the new communications path or deleting the at least the part of the previously known communications path that no longer exists.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
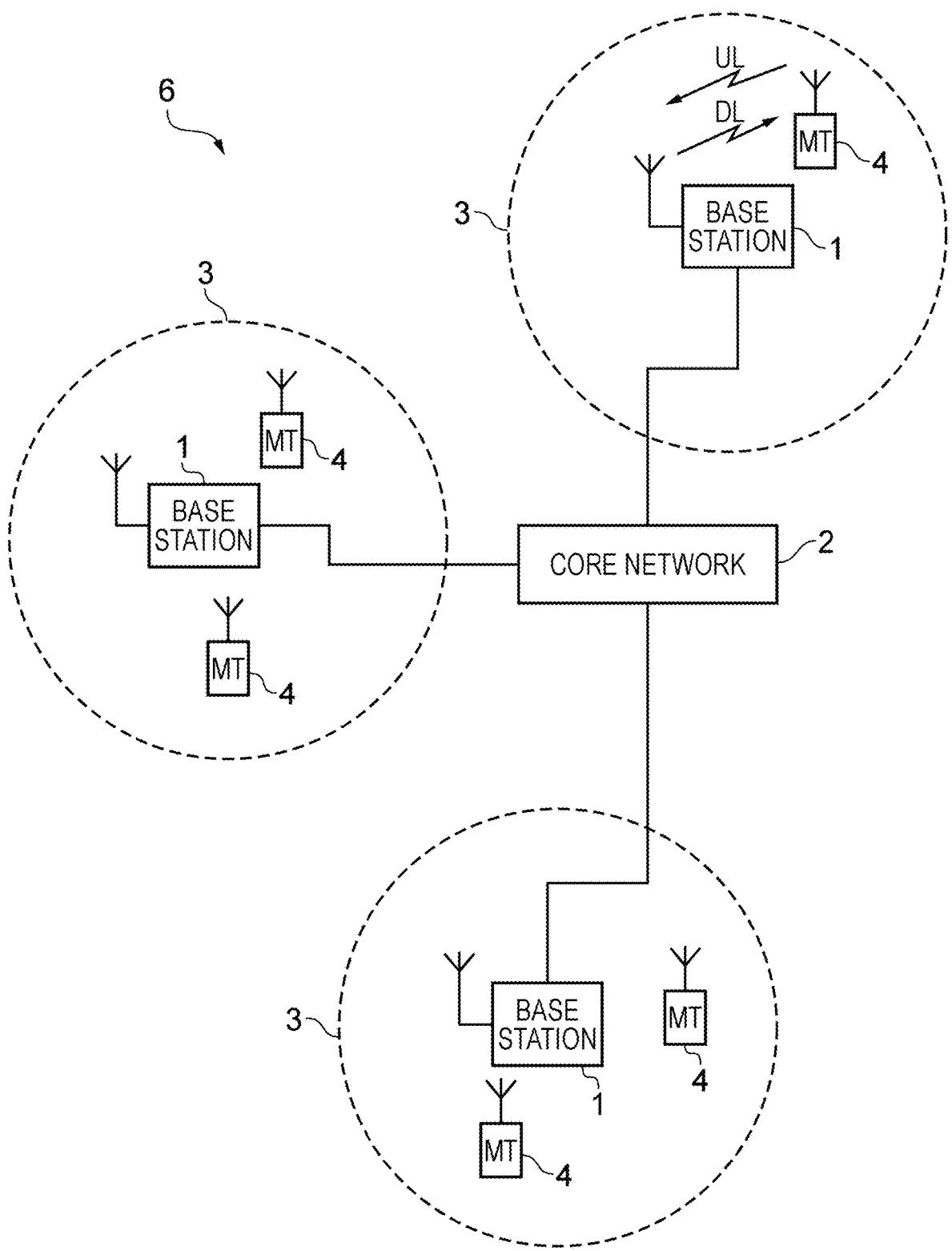
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas, remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
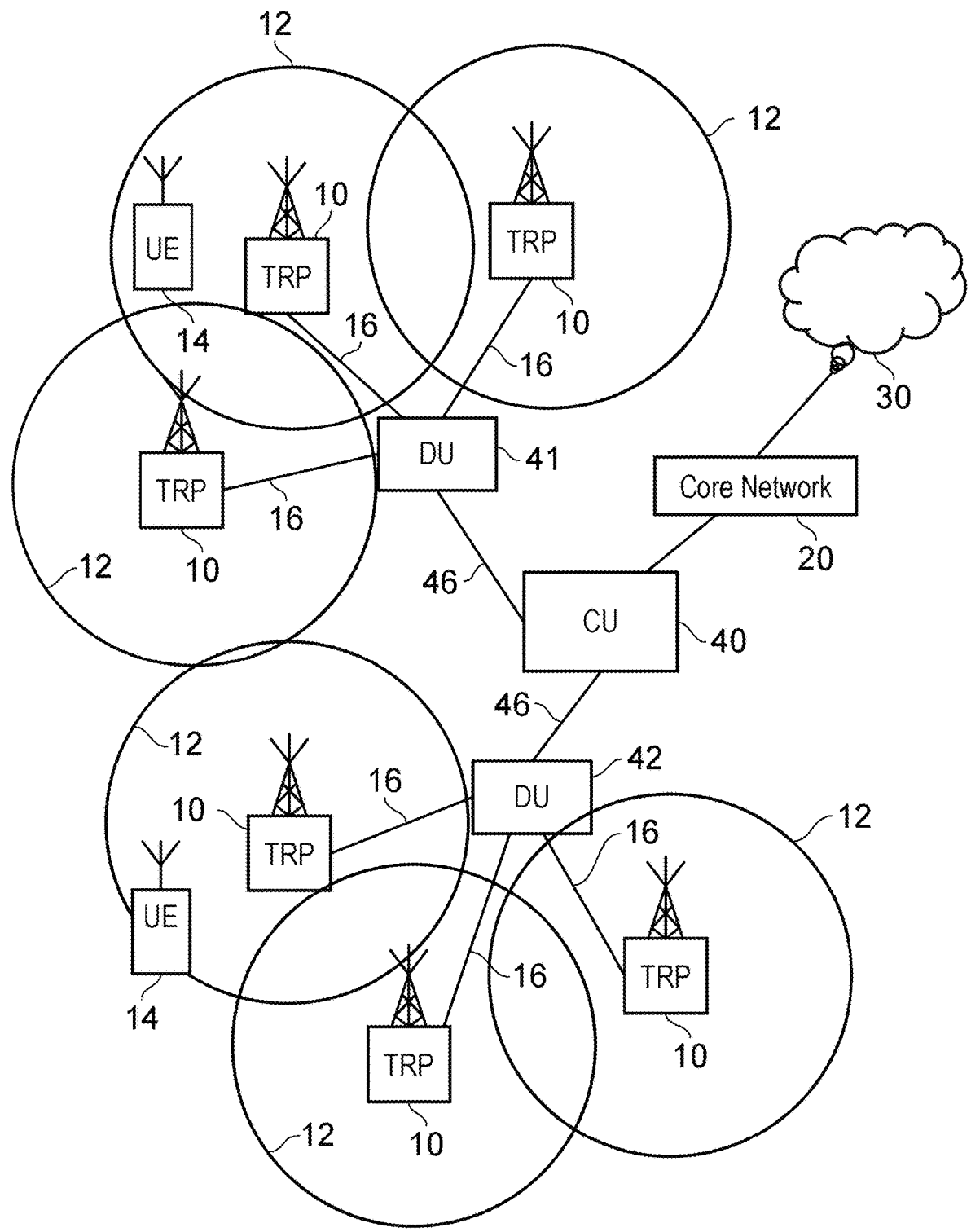
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a line 12. As such wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 of the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures. Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
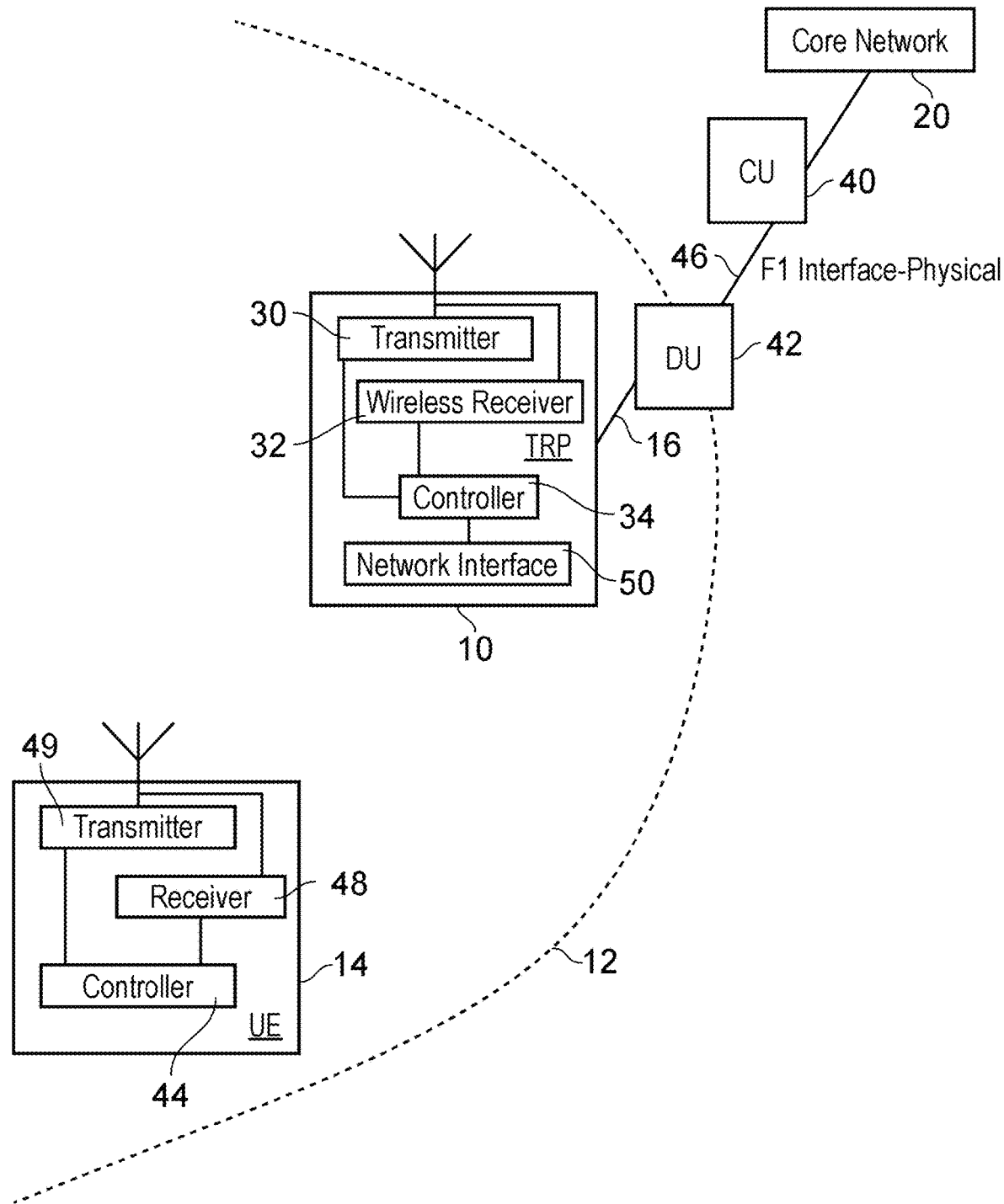
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49, the receivers 32, 48 may include radio frequency filters and amplifiers as well as signal processing components and devices in order to transmit and receive radio signals in accordance for example with the 5G standard. The controllers 34, 44 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
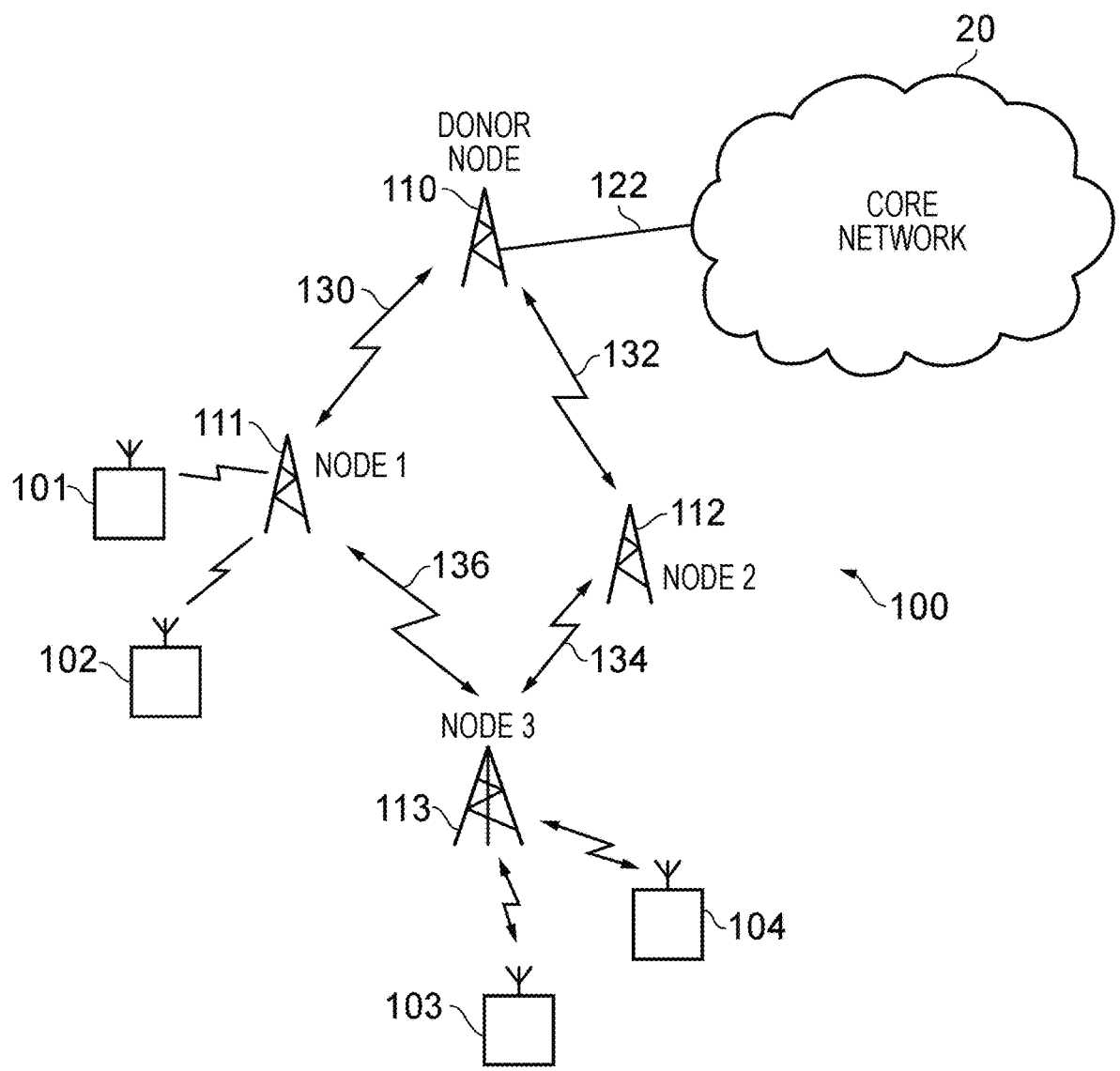
FIG. 4 schematically represents some aspects of a wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a sequence of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity in the following description, the infrastructure equipment 110 is referred to below as the 'donor node', the first infrastructure equipment 111 is referred to below as 'Node 1', the second infrastructure equipment 112 is referred to below as 'Node 2' and the third infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink data from a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:
Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
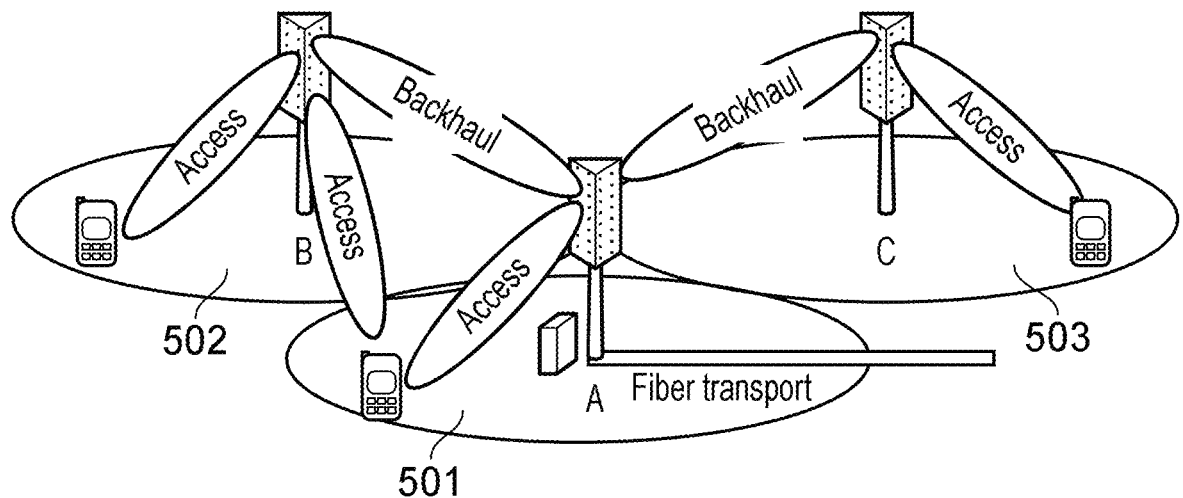
FIG. 5 is reproduced from [3], and provides a first example of an IAB deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6:
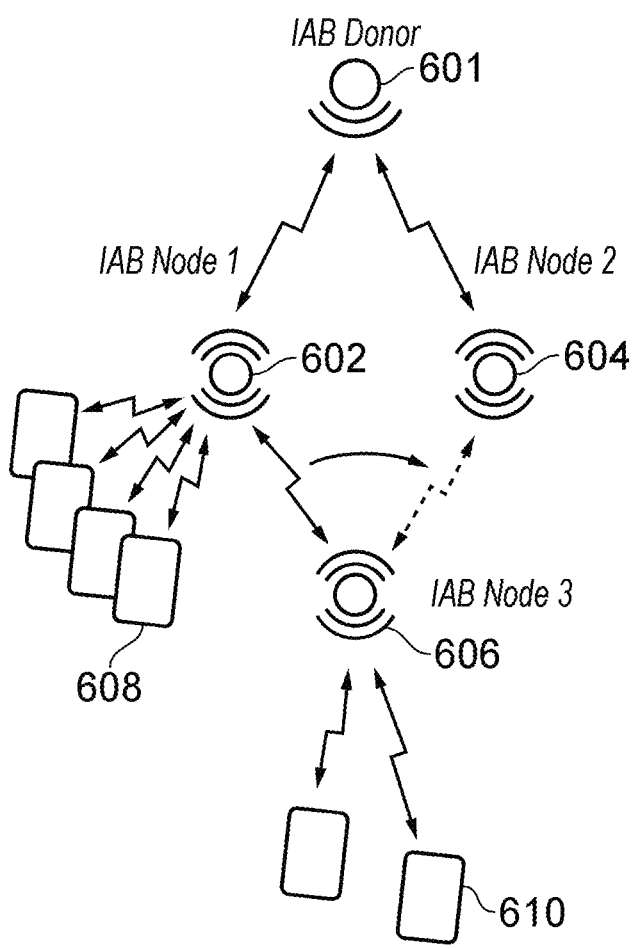
FIG. 6 is reproduced from [5], and provides a second example of an IAB deployment scenario in which there are multiple candidate routes each comprising multiple hops from the end node to the donor node.

FIG. 6 is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

Given the dynamic characteristics of wireless links, in which new nodes may emerge, existing nodes may disappear, and/or link quality between various nodes may deteriorate or improve with time, efficient and robust techniques for dynamically adding/deleting/updating peer-to-peer link information in order to maintain up-to-date route information must be developed. This is particularly true for systems comprising multiple hops, which further complicate routing.

In order to overcome the above, and considering multi-hops on the backhaul link and that topology adaptation should be considered in the case that blockages or congestion occur in the backhaul link, embodiments of the present technique seek to address route management in backhaul links. This route management includes route addition, route updating and route deletion; hence enabling efficient topology management.

Candidate Route Management in IAB

Figure 7:
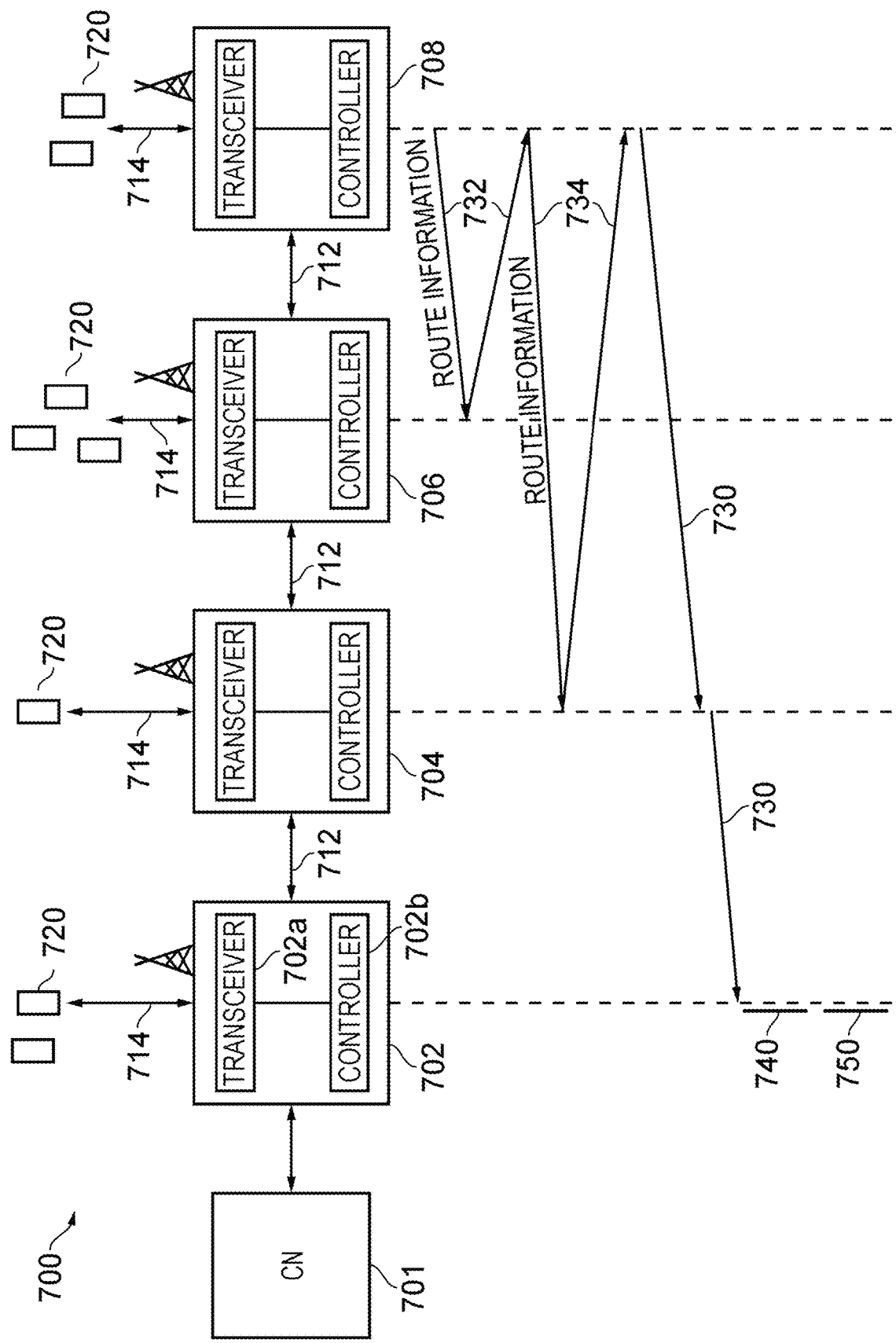
FIG. 7 shows a part schematic, part message flow diagram of communications in a wireless communications network in accordance with embodiments of the present technique.

FIG. 7 shows a part schematic, part message flow diagram of communications in a wireless communications network 700 in accordance with embodiments of the present technique. The wireless communications network 700 comprising a plurality of infrastructure equipment 702, 704, 706, 708 each being configured to communicate with one or more others of the infrastructure equipment 702, 704, 706, 708 via a backhaul communications link 712, one or more of the infrastructure equipment 702, 704, 706, 708 each being configured to communicate with one or more communications devices 720 via a wireless access interface 714, wherein a first of the infrastructure equipment 702 is configured to act as a donor node connected to a core network part 701 of the wireless communications network 700 and comprises transceiver circuitry 702$a$ and controller circuitry 702$b$ configured in combination to receive 730, from a second of the infrastructure equipment 708, information 732, 734 relating to each of a plurality of different communications paths from the second infrastructure equipment 708 to the first infrastructure equipment 702 via one or more others of the infrastructure equipment 704, 706 acting as relay nodes, to determine 740, based on the received information relating to the plurality of different communications paths 730, that either at least a part of a new communications path exists between the first of the infrastructure equipment 702 and the second of the infrastructure equipment 708 or at least a part of a previously known communications path no longer exists between the first of the infrastructure equipment 702 and the second of the infrastructure equipment 708, and to update 750 a communications path list by either adding the at least the part of the new communications path or deleting the at least the part of the previously known communications path that no longer exists.

The at least the part of the new communications path or the at least the part of the previously known communications path may in some cases be the whole path from the donor node (the first infrastructure equipment) to the end node (the second infrastructure equipment) via the relay nodes (the one or more others of the infrastructure equipment acting as the relay nodes). However in other cases, the at least the part of the new communications path or the at least the part of the previously known communications path may be a single or multiple hops without being the whole path from the donor node to the end node (e.g. the end node to the next hop relay node, or between two relay nodes, or between a relay node to the donor node).

Here, the information relating to the plurality of different communications paths may be measurement reports on whether the link is good or bad as shown in FIG. 7, or may alternatively be load information on whether the node load is high, medium and low, or may relate to the load balancing strategy at the donor node i.e. although the link quality is good, the route may still not be selected for load balancing reasons.

Route Addition

When a new relay node (it should be appreciated that in embodiments of the present technique, this may be an eNodeB/TRP, a UE, or other infrastructure equipment) emerges, for example through random access to a previous hop relay node and declares itself as a relay node (or otherwise gets instructions to do so from the core network), this potentially new route information should be recorded and also should be forwarded to the donor node if necessary.

For example, taking the system of FIG. 6, if the second IAB node 604 has newly emerged and declares itself as a relay node, the IAB donor node 601 will record a new route from the IAB donor node 601 to the second IAB node 604. The third (end) IAB node 606 will send a measurement report to the first IAB node 602 with the inclusion of a link quality (if this is above a certain threshold) between the second IAB node 604 and the third IAB node 606. In other words, the determining that the at least the part of the new communications path exists comprises determining from the received information that a link quality between two of the infrastructure equipment forming part of the at least the part of the new communications path is above a predetermined threshold.

Then, the first IAB node 602 will realise that there is a potential new route from the IAB donor node 601 to the third (end) IAB node 606 via the second IAB node 604, in addition to the known route via the first IAB node 602, or at least realise the potential part of this new route from the IAB donor node 601 to the second IAB node 604. The first IAB node 602 will record the new route and at the same time it may notify this information to its previous hop relay node as well, it has one. Then, the IAB donor node 601 may record this new candidate route as IAB donor node 601 to second IAB node 604 to third IAB node 606.

It should be noted that it is up to the IAB donor node's 601 implementation to record the entire route as one as above, or separately in its constituent parts as IAB donor node 601 to second IAB node 604 and second IAB node 604 to third IAB node 606, or in the form of {destination, next-hop} e.g. {third IAB node 606, second IAB node 604}. In other words, the communications path list is updated by the first infrastructure equipment and comprises each of the known communications paths between the first infrastructure equipment and the second infrastructure equipment via the infrastructure equipment acting as the relay nodes, or the communications path list is updated by the first infrastructure equipment and comprises each of the known communications paths between the first infrastructure equipment and the other infrastructure equipment.

Alternatively, different nodes could record part of the route independently; i.e. IAB donor node 601 may record the part of the IAB donor node 601 to second IAB node 604, while the second IAB node 604 may record the part of the second IAB node 604 to third IAB node 606. The donor node 601 here distributes routing information to the second IAB node 604 (or indeed to any node which records any part of a route) such that the second IAB node 604 is able to record the part of the route from the second IAB node 604 to third IAB node 606. In other words, the communications path list is updated by a plurality of the infrastructure equipment, each of the plurality of the infrastructure equipment updating at least part of the communications path list.

In an arrangement, the first IAB node 602 could forward the measurement report from the third IAB node 606, including the measurement results of the path between the third IAB node 606 and the second IAB node 604, to the IAB donor node 601, then the IAB donor node 601 would be able to deduce that there could be a potential route comprising the path between the third IAB node 606 and the second IAB node 604. In other words, the information is received at the first infrastructure equipment from the second infrastructure equipment via a known communications path comprising one or more others of the infrastructure equipment acting as relay nodes.

This routing information may be sent, for example, via a dedicated RRC signaling, or using a MAC control element (CE), or via F1 interface application protocol (AP) signalling.

However, before the new route is actually activated, admission control should be conducted in advance at the second IAB node 604. There are several options through which to do this.

The donor node 601 asks for the admission on behalf of the end node 606. For example, after the IAB donor node 601 gets the candidate route information of the second IAB node 604 to the third IAB node 606, it will send the admission request to the second IAB node 604 on behalf of the third IAB node 606. If the second IAB node 604 accepts the admission, it may send, for example, a reserved preamble for random access or reserved resources for data transmission to the IAB donor node 601. The IAB donor node 601 may then forward these allocations to the third IAB node 606. The admission request could be sent using any one of: RRC dedicated signalling, physical layer signaling, MAC CE or F1-AP message, DU-DU signalling or X2-AP message. In other words, conducting the admission control using this option comprises transmitting an admission request for the at least the part of the new communications path, by the first infrastructure equipment, to an intermediate infrastructure equipment forming part of the at least the part of the new communications path between the first infrastructure equipment and the second infrastructure equipment, receiving, at the first infrastructure equipment an admission request acceptance signal from the intermediate infrastructure equipment, and communicating, by the first infrastructure equipment, with the second infrastructure equipment via the new communications path comprising the intermediate infrastructure equipment.

The end node 606 asks for the admission by itself. For example, the third IAB node 606 finds the existence of the second IAB node 604 via making measurements, and will initiate a random access procedure. The second IAB node 604 will then decide whether it will accept the access request or not. If the third IAB node 606 successfully accesses the second IAB node 604, it will send the route information, of the second IAB node 604 to the third IAB node 606, to the IAB donor node 601. The admission request may be inferred from a reserved preamble resource or a message transmitted after a random access procedure e.g. MSG3 or MSG3.5 or MSG5. In other words, conducting the admission control using this option comprises transmitting an admission request for the at least the part of the new communications path, by the second infrastructure equipment, to an intermediate infrastructure equipment forming part of the at least the part of the new communications path between the first infrastructure equipment and the second infrastructure equipment, receiving, at the second infrastructure equipment an admission request acceptance signal from the intermediate infrastructure equipment, transmitting, by the second infrastructure equipment, an indication of the admission request acceptance signal to the first infrastructure equipment, and communicating, by the first infrastructure equipment, with the second infrastructure equipment via the new communications path comprising the intermediate infrastructure equipment.

The intermediate node 604 may declare it is part of a new route/path by itself. The intermediate node 604 will broadcast its access barring information via system information. The end node 606 should read its system information before sending the candidate route information. The end node 606 is in RRC_Connected mode already but may treat itself as being in IDLE mode while accessing a new node, for the purpose of redundancy or load balancing. In other words, conducting the admission control using this option comprises broadcasting, by an intermediate infrastructure equipment forming part of the at least the part of the new communications path between the first infrastructure equipment and the second infrastructure equipment, an admission acceptance signal of the at least the part of the new communications path, and communicating, by the first infrastructure equipment, with the second infrastructure equipment via the new communications path comprising the intermediate infrastructure equipment.

Route Deletion

Similarly to the situation of route addition, when an existing route is no longer feasible, the corresponding route information should be updated accordingly.

For example, route deletion may be required if an IAB node disappears suddenly or the link quality between the second IAB node 604 and the third IAB node 606 is not good anymore (e.g. it falls below a predetermined threshold). In other words, the determining that the at least the part of the previously known communications path no longer exists comprises determining from the received information that a link quality between two of the infrastructure equipment forming part of the at least the part of the previously known communications path is below a predetermined threshold.

The first IAB node 602 may detect such an occurrence, for example, from the measurement report of the third IAB node 606, or the IAB donor node 601 may detect it, for example, by sending data to the second IAB node 604 without receiving any acknowledgement. In the first case, the first IAB node 602 may delete the route information of the second IAB node 604 to the third IAB node 606 and may inform the IAB donor node 601 of this as well. In the second case, the IAB donor node 601 may delete the route information of the path between itself and the second IAB node 604 (as well as that between the second IAB node 604 and the third IAB node 606).

Alternatively, the determining that the at least the part of the previously known communications path no longer exists comprises determining from the received information that the one of the infrastructure equipment acting as the relay nodes through which the communications path passes is no longer visible to the other infrastructure equipment on the at least the part of the previously known communications path. For example, one of the nodes on the route may have moved out of range of the other nodes on the route (or at least out of range of one of the next hop nodes on the route), or may have had a power issue or failure of some kind and has as such "disappeared" from the point of view of the other nodes on the path.

As another alternative, the determining that the at least the part of the previously known communications path no longer exists comprises determining from the received information that one of the infrastructure equipment has indicated that the at least the part of the previously known communications path should no longer exist. The indication that the previously known communications path should know longer exist may be transmitted by one of the nodes on the (previously known) communications path in response to a particular or predetermined trigger, and received by the donor node as at least part of the information relating to the communications paths. Here, the IAB node can initiate route deletion or modification any time towards another node (either upstream or downstream). The trigger may be based on an overload at a node or due to load balancing requirements. This situation may occur after the route has been accepted initially, but later on due to, for example, traffic from normal UEs having increased or due to, for example, a change in radio conditions, the other node may either share the load or take over completely, thus requiring deletion or modification of the previously known communications path in the route table (communications path list).

Again, as above, this route information may be sent, for example, via a dedicated RRC signaling or MAC CE or F1-AP or X2-AP or similar.

Flow Chart Representation

Figure 8:
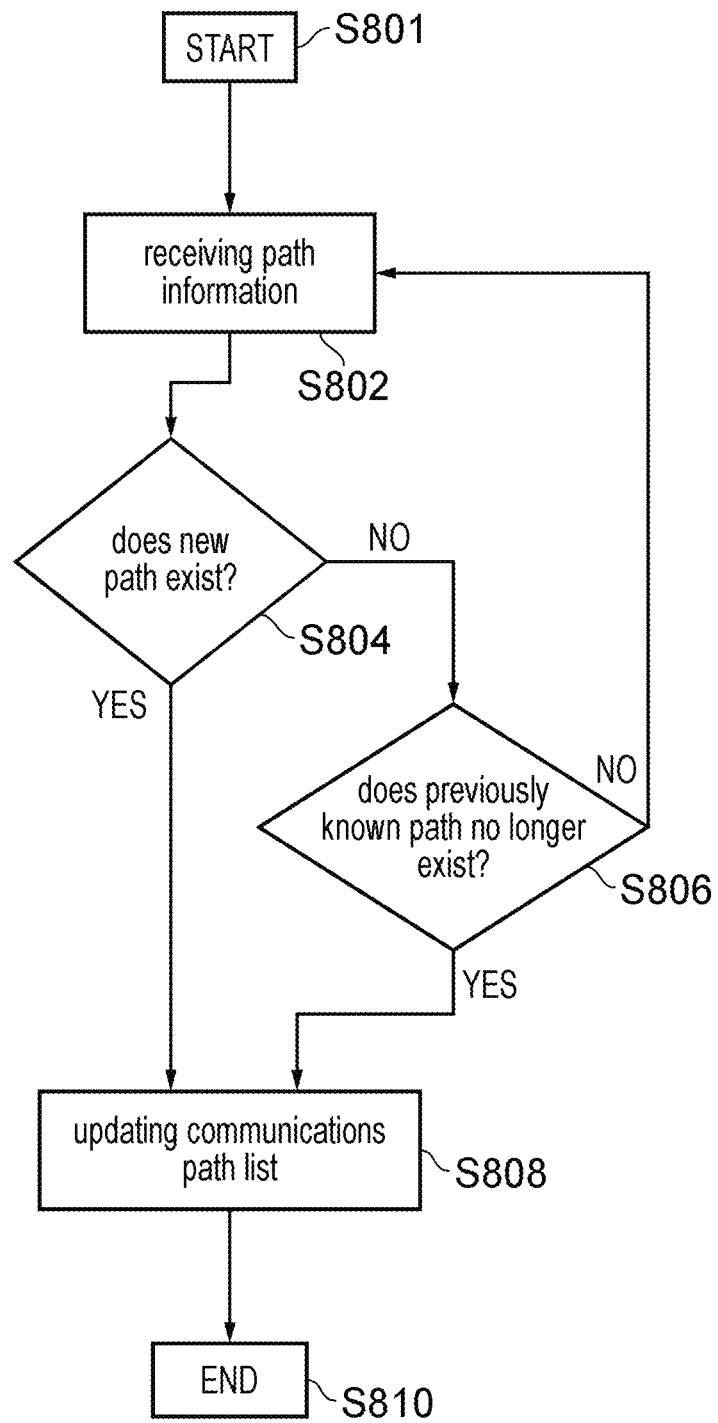
FIG. 8 shows a flow diagram illustrating a process of communications in a communications system in accordance with embodiments of the present technique.

FIG. 8 shows a flow diagram illustrating a process of communications in a communications system in accordance with embodiments of the present technique. The process shown by FIG. 8 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via a wireless access interface.

The method begins in step S801. The method comprises, in step S802, receiving, at a first of the infrastructure equipment acting as a donor node connected to a core network part of the wireless communications network, from a second of the infrastructure equipment, information relating to each of a plurality of different communications paths from the second infrastructure equipment to the first infrastructure equipment via one or more others of the infrastructure equipment acting as relay nodes. The process proceeds to step S804, which comprises determining, based on the received information relating to the plurality of different communications paths, that at least a part of a new communications path exists between the first of the infrastructure equipment and the second of the infrastructure equipment. If the outcome of this determination is positive, i.e. a new route does exist, then the method proceeds to step S808, which comprises updating a communications path list by adding the at least the part of the new communications path. If however, the outcome of the determination is negative, i.e. no new route exists, then the process proceeds to step S806, which comprises determining, based on the received information relating to the plurality of different communications paths, that at least a part of a previously known communications path no longer exists between the first of the infrastructure equipment and the second of the infrastructure equipment. If the outcome of this determination is positive, i.e. a previously known route no longer exists, then the method again proceeds to step S808, which comprises updating the communications path list by deleting the at least the part of the previously known communications path that no longer exists. If however, the outcome of this determination is negative, i.e. no previously known routes are determined to no longer exist, then the infrastructure equipment will continue to receive information relating to the plurality of different communications paths and monitor for the potential addition or deletion of routes. The process ends in step S810.

Those skilled in the art would appreciate that the method shown by FIG. 8 may be adapted in accordance with embodiments of the present technique. For example, other intermediate steps may be included in the method, or the steps may be performed in any logical order, such as the determination as to whether or not an existing path no longer exists being made before the determination as to whether or not a new path exists is made.

Though embodiments of the present technique have been described by way of the example systems shown in FIGS. 6 and 7, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via a wireless access interface, the method comprising receiving, at a first of the infrastructure equipment acting as a donor node connected to a core network part of the wireless communications network, from a second of the infrastructure equipment, information relating to each of a plurality of different communications paths from the second infrastructure equipment to the first infrastructure equipment via one or more others of the infrastructure equipment acting as relay nodes, determining, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and updating a communications path list by either adding the at least the part of the new communications path or deleting the at least the part of the previously known communications path that no longer exists.

Paragraph 2. A method according to Paragraph 1, wherein the determining that the new communications path exists comprises determining from the received information that a link quality between two of the infrastructure equipment forming part of the at least the part of the new communications path is above a predetermined threshold.

Paragraph 3. A method according to Paragraph 1 or Paragraph 2, wherein the determining that the at least the part of the previously known communications path no longer exists comprises determining from the received information that a link quality between two of the infrastructure equipment forming part of the previously known communications path is below a predetermined threshold.

Paragraph 4. A method according to any of Paragraphs 1 to 3, wherein the determining that the at least the part of the previously known communications path no longer exists comprises determining from the received information that the one of the infrastructure equipment acting as the relay nodes through which the communications path passes is no longer visible to the other infrastructure equipment on the previously known communications path.

Paragraph 5. A method according to any of Paragraphs 1 to 4, wherein the determining that the at least the part of the previously known communications path no longer exists comprises determining from the received information that one of the infrastructure equipment has indicated that the previously known communications path should no longer exist.

Paragraph 6. A method according to any of Paragraphs 1 to 5, wherein the communications path list is updated by the first infrastructure equipment and comprises each of the known communications paths between the first infrastructure equipment and the second infrastructure equipment via the infrastructure equipment acting as the relay nodes.

Paragraph 7. A method according to any of Paragraphs 1 to 6, wherein the communications path list is updated by the first infrastructure equipment and comprises each of the known communications paths between the first infrastructure equipment and the other infrastructure equipment.

Paragraph 8. A method according to any of Paragraphs 1 to 7, wherein the communications path list is updated by a plurality of the infrastructure equipment, each of the plurality of the infrastructure equipment updating at least part of the communications path list.

Paragraph 9. A method according to any of Paragraphs 1 to 8, wherein the information relating to the plurality of different communications paths is received at the first infrastructure equipment from the second infrastructure equipment via a known communications path comprising one or more others of the infrastructure equipment acting as relay nodes.

Paragraph 10. A method according to any of Paragraphs 1 to 9, comprising transmitting an admission request for the at least the part of the new communications path, by the first infrastructure equipment, to an intermediate infrastructure equipment forming part of the at least the part of the new communications path between the first infrastructure equipment and the second infrastructure equipment, receiving, at the first infrastructure equipment an admission request acceptance signal from the intermediate infrastructure equipment, and communicating, by the first infrastructure equipment, with the second infrastructure equipment via the new communications path comprising the intermediate infrastructure equipment.

Paragraph 11. A method according to any of Paragraphs 1 to 10, comprising
- transmitting an admission request for the at least the part of the new communications path, by the second infrastructure equipment, to an intermediate infrastructure equipment forming part of the at least the part of the new communications path between the first infrastructure equipment and the second infrastructure equipment,
- receiving, at the second infrastructure equipment an admission request acceptance signal from the intermediate infrastructure equipment,
- transmitting, by the second infrastructure equipment, an indication of the admission request acceptance signal to the first infrastructure equipment, and
- communicating, by the first infrastructure equipment, with the second infrastructure equipment via the new communications path comprising the intermediate infrastructure equipment.

Paragraph 12. A method according to any of Paragraphs 1 to 11, comprising
- broadcasting, by an intermediate infrastructure equipment forming part of the at least the part of the new communications path between the first infrastructure equipment and the second infrastructure equipment, an admission acceptance signal of the at least the part of the new communications path, and
- communicating, by the first infrastructure equipment, with the second infrastructure equipment via the new communications path comprising the intermediate infrastructure equipment.

Paragraph 13. A wireless communications network comprising a plurality of infrastructure equipment each being configured to communicate with one or more others of the infrastructure equipment via a backhaul communications link, one or more of the infrastructure equipment each being configured to communicate with one or more communications devices via a wireless access interface, wherein a first of the infrastructure equipment is configured to act as a donor node connected to a core network part of the wireless communications network and comprises transceiver circuitry and controller circuitry configured in combination
- to receive, from a second of the infrastructure equipment, information relating to each of a plurality of different communications paths from the second infrastructure equipment to the first infrastructure equipment via one or more others of the infrastructure equipment acting as relay nodes,
- to determine, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and
- to update a communications path list by either adding the at least the part of the new communications path or deleting the at least the part of the previously known communications path that no longer exists.

Paragraph 14. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via a wireless access interface, wherein a first of the infrastructure equipment is configured to act as a donor node connected to a core network part of the wireless communications network and comprises transceiver circuitry and controller circuitry configured in combination
- to receive, from a second of the infrastructure equipment, information relating to each of a plurality of different communications paths from the second infrastructure equipment to the first infrastructure equipment via one or more others of the infrastructure equipment acting as relay nodes,
- to determine, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and
- to update a communications path list by either adding the at least the part of the new communications path or deleting the at least the part of the previously known communications path that no longer exists.

Paragraph 15. A method of operating a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via a wireless access interface, wherein the first infrastructure equipment is configured to act as a donor node connected to a core network part of the wireless communications network, the method comprising
- receiving, from a second of the infrastructure equipment, information relating to each of a plurality of different communications paths from the second infrastructure equipment to the first infrastructure equipment via one or more others of the infrastructure equipment acting as relay nodes,
- determining, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and
- updating a communications path list by either adding the at least the part of the new communications path or deleting the at least the part of the previously known communications path that no longer exists.

Paragraph 16. A first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via a wireless access interface, wherein the first infrastructure equipment is configured to act as a donor node connected to a core network part of the wireless communications network and comprises transceiver circuitry and controller circuitry configured in combination to receive, from a second of the infrastructure equipment, information relating to each of a plurality of different communications paths from the second infrastructure equipment to the first infrastructure equipment via one or more others of the infrastructure equipment acting as relay nodes, to determine, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and to update a communications path list by either adding the at least the part of the new communications path or deleting the at least the part of the previously known communications path that no longer exists.

Paragraph 17. Circuitry for a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via a wireless access interface, wherein the first infrastructure equipment is configured to act as a donor node connected to a core network part of the wireless communications network and comprises transceiver circuitry and controller circuitry configured in combination to receive, from a second of the infrastructure equipment, information relating to each of a plurality of different communications paths from the second infrastructure equipment to the first infrastructure equipment via one or more others of the infrastructure equipment acting as relay nodes, to determine, based on the received information relating to the plurality of different communications paths, that either at least a part of a new communications path exists between the first of the infrastructure equipment and the second of the infrastructure equipment or at least a part of a previously known communications path no longer exists between the first of the infrastructure equipment and the second of the infrastructure equipment, and to update a communications path list by either adding the at least the part of the new communications path or deleting the at least the part of the previously known communications path that no longer exists.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170831, "New SID Proposal: Study on Integrated Access and Backhaul for NR", AT&T, 3GPP RAN Meeting #75, Dubrovnik, Croatia, March 2017.

[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.

What is claimed is:

1. A first infrastructure equipment forming part of a wireless communications network comprising the first infrastructure equipment and a second infrastructure equipment, the first infrastructure equipment configured to communicate with the second infrastructure equipment via a backhaul communications link, wherein the first infrastructure equipment is configured to act as a donor node connected to a core network part of the wireless communications network and comprises:

circuitry configured to receive, from the second infrastructure equipment, information relating to a first communications path from the second infrastructure equipment to the first infrastructure equipment via a first intermediate infrastructure equipment and a second communication path via a second intermediate infrastructure equipment from the second infrastructure equipment to the first infrastructure equipment; and based on the received information, update a communications path list by either adding the first communications path as a part of a new communications path or deleting the second communications path as a part of a previously known communications path that no longer exists.

2. The first infrastructure equipment of claim 1, wherein the circuitry is configured to:

determine, based on the received information, that the first communications path newly exists between the first of the infrastructure equipment and the second of the infrastructure equipment, or that the second communication path is part of a previously known communications path that no longer exists between the first of the infrastructure equipment and the second of the infrastructure equipment.

3. The first infrastructure equipment of claim 2, wherein determining that the first communications path newly exists comprises determining from the received information that a link quality of the first communications path is above a predetermined threshold.

4. The first infrastructure equipment of claim 2, wherein determining that the at least the part of the second communication path no longer exists comprises determining from the received information that a link quality between infrastructure equipment forming part of the second communication path is below a predetermined threshold.

5. The first infrastructure equipment of claim 2, wherein determining that the at least the part of the second communications path no longer exists comprises determining from the received information that infrastructure equipment acting as relay node(s) through which the second communications path passes is no longer visible to other infrastructure equipment on the second communication path.

6. The first infrastructure equipment of claim 2, wherein determining that the at least the part of the second communications path no longer exists comprises determining from the received information that the first infrastructure equipment has indicated that the previously known communications path should no longer exist.

7. The first infrastructure equipment of claim 1, wherein the communications path list comprises each known communications paths between the first infrastructure equipment and the second infrastructure equipment.

8. The first infrastructure equipment of claim 1, wherein the communications path list comprises each known communication path between the first infrastructure equipment and other infrastructure equipment.

9. The first infrastructure equipment of claim 1, wherein the communications path list is updated by a plurality of infrastructure equipment.

10. The first infrastructure equipment of claim 1, wherein the information is received from the second infrastructure equipment via a known communications path comprising one or more other infrastructure equipment acting as relay nodes.

11. The first infrastructure equipment of claim 1, wherein the circuitry is configured to:
    transmit an admission request for at least a part of the first communications path to an intermediate infrastructure equipment forming at least part of the second communications path between the first infrastructure equipment and the second infrastructure equipment.

12. The first infrastructure equipment of claim 11, wherein the circuitry is configured to:
    receive an admission request acceptance signal from the intermediate infrastructure equipment.

13. The first infrastructure equipment of claim 12, wherein the circuitry is configured to:
    communicate with the second infrastructure equipment via the second communications path via the intermediate infrastructure equipment.

14. A method performed by a first infrastructure equipment forming part of a wireless communications network comprising the first infrastructure equipment and a second infrastructure equipment, the first infrastructure equipment configured to communicate with the second infrastructure equipment via a backhaul communications link, wherein the first infrastructure equipment is configured to act as a donor node connected to a core network part of the wireless communications network, the method comprising:
    receiving, from the second infrastructure equipment, information relating to a first communications path from the second infrastructure equipment to the first infrastructure equipment via a first intermediate infrastructure equipment and a second communication path via a second intermediate infrastructure equipment from the second infrastructure equipment to the first infrastructure equipment; and
    based on the received information, updating a communications path list by either adding the first communications path as a part of a new communications path or deleting the second communications path as a part of a previously known communications path that no longer exists.

15. The method of claim 14, further comprising:
    determining, based on the received information, that the first communications path newly exists between the first of the infrastructure equipment and the second of the infrastructure equipment, or that the second communication path is part of a previously known communications path that no longer exists between the first of the infrastructure equipment and the second of the infrastructure equipment.

16. The method of claim 15, wherein
    determining that the first communications path newly exists comprises determining from the received information that a link quality of the first communications path is above a predetermined threshold.

17. The method of claim 15, wherein
    determining that the at least the part of the second communication path no longer exists comprises determining from the received information that a link quality between infrastructure equipment forming part of the second communication path is below a predetermined threshold.

18. The method of claim 15, wherein
    determining that the at least the part of the second communications path no longer exists comprises determining from the received information that infrastructure equipment acting as relay node(s) through which the second communications path passes is no longer visible to other infrastructure equipment on the second communication path.

19. The method of claim 15, wherein
    determining that the at least the part of the second communications path no longer exists comprises determining from the received information that the first infrastructure equipment has indicated that the previously known communications path should no longer exist.

20. A first infrastructure equipment forming part of a wireless communications network comprising the first infrastructure equipment and a second infrastructure equipment, the first infrastructure equipment configured to communicate with the second infrastructure equipment via a backhaul communications link, wherein the first infrastructure equipment is configured to act as a donor node connected to a core network part of the wireless communications network and comprises control circuitry and transceiver circuitry configured to:
    receive, from the second infrastructure equipment, information relating to a first communications path from the second infrastructure equipment to the first infrastructure equipment via a first intermediate infrastructure equipment and a second communication path via a second intermediate infrastructure equipment from the second infrastructure equipment to the first infrastructure equipment; and
based on the received information, update a communications path list by either adding the first communications path as a part of a new communications path or deleting the second communications path as a part of a previously known communications path that no longer exists.

* * * * *